United States Patent [19]

Hirakawa et al.

[11] Patent Number: 4,781,449

[45] Date of Patent: Nov. 1, 1988

[54] WIDE ANGLE READING LENS SYSTEM

[75] Inventors: Jun Hirakawa; Yasunori Arai, both of Tokyo, Japan

[73] Assignee: Asahi Kogaku Kogyo Kabushiki Kaisha, Tokyo, Japan

[21] Appl. No.: 93,283

[22] Filed: Sep. 4, 1987

[30] Foreign Application Priority Data

Sep. 5, 1986 [JP] Japan .................................. 61-210390

[51] Int. Cl.$^4$ ............................................... G02B 9/36
[52] U.S. Cl. .................................................... 350/469
[58] Field of Search ........................................ 350/469

[56] References Cited

U.S. PATENT DOCUMENTS 4,591,234  5/1986  Hamanishi ............................ 350/469

Primary Examiner—John K. Corbin
Assistant Examiner—Rebecca D. Gass
Attorney, Agent, or Firm—Sughrue, Mion, Zinn, Macpeak & Seas

[57] ABSTRACT

A wide-angle reading lens system is disclosed which comprises, in order from the object side, a first lens element which is a negative meniscus lens having its convex surface directed toward the object side, a second lens element which is a positive lens having a strong convex surface directed toward the object side, a third lens element which is a negative lens, and a fourth lens element which is a positive lens having an strong convex surface directed toward the image side, said lens system satisfying the following conditions:

$$-2/0f \leq f_1 \leq -0.75f \quad (1)$$

$$\frac{n_2 + n_4}{2} \geq 1.72, \quad (2)$$

$$\nu_2, \nu_4 \geq 35$$

$$d_{1\text{-}7} \leq 0.85f \quad (3)$$

where f denotes the overall focal length of the system; $f_1$ is the focal length of the first lens element; $n_i$ is the refractive index of an ith lens at the d-line; $\nu_i$ is the abbe number of the ith lens; and $d_{1\text{-}7}$ signifies the distance from the surface of the first lens element on the object side to the surface of the fourth lens element on the image side.

7 Claims, 5 Drawing Sheets

WIDE ANGLE READING LENS SYSTEM

BACKGROUND OF THE INVENTION

The present invention relates to a reading lens system used in the optics of an apparatus such as a facsimile or an image scanner. More specifically, the present invention relates to a reading lens system that has an aperture ratio of approximately 1:4.5 to 1:5.6 and which features a wide range of half view angles of from approximately 28° to 30°.

Reading lens systems used in facsimiles, image scanners and other apparatus of the type that focuses the image of an original at a reduced scale on an imaging device such as CCD are required to have high resolution at the image-forming magnification used and to admit a large quantity of marginal light while producing a small degree of distortion.

The lens systems that have heretofore been proposed with a view to satisfy these requirements include those of the Gauss type, Tessar type and Ernostar type (see, for example, Japanese Patent Publication Nos. 49884/1985 and 51090/1985, and Unexamined Published Japanese Patent Application No. 90810/1984).

The demand of users for reduction in the size of facsimiles and image scanner constantly increases and a need has recently arisen to develop lens systems of Gauss, Tessar or Ernostar type that feature a sufficient narrow view angle to enable shortening of the distance from the original to the imaging device. Cost reduction is another obvious requirement and it has become necessary to reduce the number of lens components.

The prior art lens systems of Gauss and Tessar type are capable of retaining their high performance up to a half-view angle of approximately 20° and if the range is expanded to half-view angle of about 30°, it becomes impossible to compensate for astigmatism and curvature of field. Furthermore, at such a large half view angle, the law of $\cos^4 \omega$ causes a dramatic decrease in the quantity of marginal light even if the aperture efficiency is maintained at 100%.

Prior art versions of wide-angle lens systems for use in facsimiles are described in Japanese Patent Publication No. 32852/1985 and Unexamined Published Japanese patent application No. 95416/1985. However, these lens systems have an aperture ratio of 1:2.8 and are costly because of the great number of lens components employed (6-element).

SUMMARY OF THE INVENTION

The present invention has been accomplished in order to solve the aforementioned problems of the prior art and it provides a wide-angle reading lens system with a simple 4-unit-4-element configuration that features an aperture ratio of approximately 1:4.5–1:5.6 and which ensures good performance up to a half-view angle of approximately 30° while maintaining an aperture efficiency of 100% or more for preventing decrease in the quantity of marginal light.

In order to attain this object, the lens system of the present invention is designed as a retrofocus type having a negative meniscus lens as a first lens that has its convex surface directed toward the object side, so as to increase the aperture efficiency and hence increase the quantity of marginal light. At the same time, the lens system of the present invention has successfully attained a wide-angle feature by decreasing the angle of incidence of off-axis light that is introduced into the rear group.

The lens system of the present invention that has these features comprises, in order from the object side, a first lens element which is a negative meniscus lens having its convex surface directed toward the object side, a second lens element which is a positive lens having a strong convex surface directed toward the object side, a third lens element which is a negative lens, and a fourth lens element which is a positive lens having an strong convex surface directed toward the image side, said lens system satisfying the following conditions:

$$-2.0f \leq f_1 \leq -0.75f \tag{1}$$

$$\frac{n_2 + n_4}{2} \geq 1.72, \tag{2}$$

$$\nu_2, \nu_4 \geq 35$$

$$d_{1-7} \leq 0.85f \tag{3}$$

where f denotes the overall focal length of the system; $f_1$ is the focal length of the first lens element; $n_i$ is the refractive index of an ith lens at the d-line; $\nu_i$ is the abbe number of the ith lens; and $d_{1-7}$ signifies the distance from the surface of the first lens element on the object side to the surface of the fourth lens element on the image side.

Having the configuration described above, the lens system of the present invention is capable of attaining its intended object. In order to ensure that it exhibits a better performance, the system preferably satisfies the following additional conditions:

$$d_2 \leq 0.20f \tag{4}$$

$$0.3f \leq r_3 \leq 0.8f \tag{5}$$

$$n_1 < 1.60 \tag{6}$$

$$\nu_3 < 30 \tag{7}$$

where $d_2$ signifies the aerial distance between the first and second lens elements, and $r_3$ is the curvature of radius of the surface of the second lens element on the object side.

Figure 1:
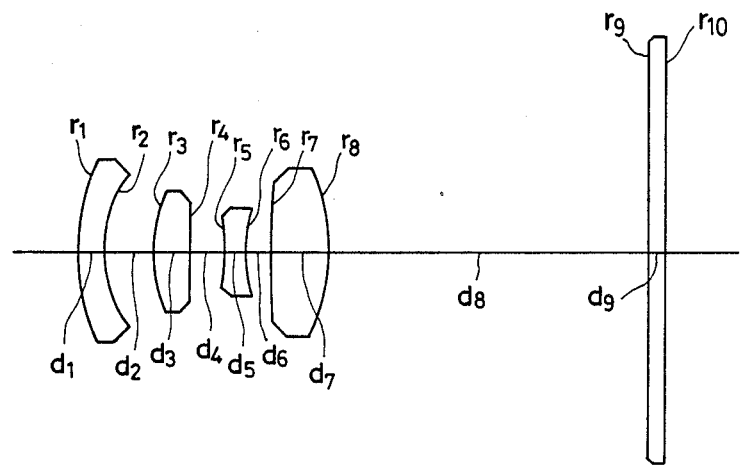
FIGS. 1, 3, 5, 7 and 9 are simplified cross-sectional views of the lens systems shown in Examples 1–5 of the present invention.

In the figures, $r_1$ signifies the radius of curvature of an individual lens surface, $d_i$ is the thickness of an individual lens or the aerial distance between lenses, and y is the image height.

DESCRIPTION OF THE PREFERRED EMBODIMENTS

The above-noted conditions (1) to (3) to be satisfied by the lens system of the present invention are explained more specifically below.

Condition (1) relates to the power of the first lens element. This condition is necessary not only for ensuring a high performance at a wide-angle end by allowing off-axis rays of light to encounter the rear group at a small angle of incidence, but also for attaining a high aperture efficiency by designing a lens system of the retrofocus type. If the lower limit of this condition is not reached (i.e., the power of the first lens element is too small), the intended wide-angle feature is not attainable. If the upper limit of this condition is exceeded (i.e., the negative power of the first lens element is excessive), the inward coma flare that occurs on the second surface ($f_2$) of the first lens element is too great to be effectively compensated for by lenses in the rear group.

Condition (2) delimits the range of optical materials that can be used to make the second and fourth lens elements. These two lenses govern the overall power of the system by their great positive power. By forming the second and fourth lenses of an optical material having a high refractive index, the Petzval sum can be reduced so as to decrease the curvature of field. If an optical material of low refractive index is used (namely, if $(n_2+n_4)/2$ is less than 1.72), the Petzval sum is increased to produce an image plane that is curved toward the object side. Furthermore, in order to attain the same power at low refractive index, the curvatures of the individual lens surfaces have to be increased but then this causes undesired phenomena such as spherical aberration and coma aberration.

The additional requirement of the optical material of which the second and fourth lens elements are made is that it should have a sufficiently large Abbe number to reduce dispersion. By satisfying this requirement, development of chromatic aberration can be minimized such that any chromatic aberration that occurs can be effectively compensated for by the negative third lens element. If each of the second and fourth lens elements is made of an optical material having an unduly small Abbe number (namely, if each of $\nu_2$ and $\nu_4$ is less than 35), considerable difficulty is encountered in compensation for chromatic aberration.

Condition (3) concerns the overall length of the lens system. One of the prerequisites for a reading lens is to maximize the quantity of marginal light and it is not desirable to restrict the passage of light other than at a stop diaphragm. Therefore, if the overall length of the system exceeds the upper limit of condition (3), the increase in the lens diameter is unavoidable. Furthermore, the off-axis light will pass through the marginal portion of each lens to cause an undesired phenomenon such as astigmatism or distortion of higher order.

Conditions (4) to (7) are necessary for permitting the lens system of the present invention to exhibit a better performance and they are hereunder described in greater detail.

Condition (4) delimits the aerial distance between the first and the second lens elements. If the upper limit of this condition is exceeded, the size of the first lens must be increased so as to receive an effective amount of off-axis light and not only does this cause a chromatic difference of magnification (i.e., transversal chromatic aberration) but also the height at which light encounters the second lens is increased to potentially cause a higher-order spherical aberration.

Condition (5) delimits the radius of curvature of the surface ($r_3$) of the second lens element on the object side. Like the 7th surface ($r_7$), this surface contributes to the development of a large positive spherical aberration. This surface ($r_3$) serves to compensate for the negative spherical aberration that has occurred on the second surface ($r_2$) and condition (5) delimits the range of aberrational compensation that can be achieved by $r_3$. If the curvature of $r_3$ is too small (namely, if the upper limit of this condition is exceeded), the occurrence of a positive spherical aberration is insufficient and coma flare will develop. If, on the other hand, the curvature of $r_3$ is too strong (i.e., the lower limit of condition (5) is not reached), a positive spherical aberration of excessive magnitude will develop to cause a higher-order spherical aberration.

Condition (6) is necessary for producing a flat image plane in cooperation with conditions (1) and (2). By holding the refractive index of the negative first lens element at a small level, the Petzval sum can be retained at a low level.

Condition (7) concerns compensation of chromatic aberration and sets forth that the chromatic aberration occurring in the positive second and fourth lenses is to be compensated for by reducing the Abbe number of the negative third lens.

EXAMPLES

Data sheets for Examples 1-5 of the present invention are shown below, in which f signifies the overall focal length of the lens system, $F_{NO}$ is the aperture ratio, M is the magnification, r is the curvature of radius of an individual lens surface, d is the thickness of an individual lens or the aerial distance between lenses, n is the refrative index of an individual lens at the d-line, and $\nu$ is the Abbe number of an individual lens. Surface Nos. 9 and 10 noted in each data sheet refer to the surfaces of the cover glass mounted on the imaging device.

| Example 1 | | | | |
|---|---|---|---|---|
| $f = 100.0 \quad F_{NO} = 1:5.6$ | | | | |
| $M = -0.12 \times$ | | | | |
| Surface No. | r | d | n | $\nu$ |
| 1 | 61.778 | 7.04 | 1.51633 | 64.1 |
| 2 | 33.566 | 15.08 | | |
| 3 | 41.283 | 10.64 | 1.77250 | 49.7 |
| 4 | −939.456 | 9.98 | | |
| 5 | −120.137 | 6.34 | 1.80518 | 25.4 |
| 6 | 49.507 | 6.99 | | |
| 7 | 206.799 | 16.34 | 1.77250 | 49.7 |
| 8 | −57.608 | 93.80 | | |
| 9 | ∞ | 4.93 | cover glass | |
| 10 | ∞ | | | |

$$f_1 = -155.74$$
$$d_{1-7} = 72.401$$

| Example 2 | | | | |
|---|---|---|---|---|
| $f = 100.0 \quad F_{NO} = 1:5.6$ | | | | |
| $M = -0.112 \times$ | | | | |
| Surface No. | r | d | n | $\nu$ |
| 1 | 72.805 | 8.11 | 1.51633 | 64.1 |
| 2 | 30.179 | 14.35 | | |
| 3 | 50.442 | 14.67 | 1.77250 | 49.7 |
| 4 | −159.578 | 7.21 | | |
| 5 | −81.889 | 8.11 | 1.80518 | 25.4 |
| 6 | 73.776 | 2.89 | | |
| 7 | −485.667 | 15.98 | 1.77250 | 49.7 |
| 8 | −42.859 | 109.90 | | |
| 9 | ∞ | 6.31 | cover glass | |
| 10 | ∞ | | | |

$$f_1 = -106.746$$
$$d_{1-7} = 71.317$$

Example 3
f = 100.0  $F_{NO}$ = 1:4.5
M = −0.112 ×

| Surface No. | r | d | n | ν |
|---|---|---|---|---|
| 1 | 75.126 | 8.08 | 1.51633 | 64.1 |
| 2 | 35.907 | 13.38 | | |
| 3 | 52.334 | 12.93 | 1.80400 | 46.6 |
| 4 | −224.991 | 7.18 | | |
| 5 | −58.483 | 8.08 | 1.80518 | 25.4 |
| 6 | 82.585 | 1.71 | | |
| 7 | −1141.508 | 17.24 | 1.80400 | 46.6 |
| 8 | −42.253 | 106.70 | | |
| 9 | ∞ | 6.28 | cover glass | |
| 10 | ∞ | | | |

$f_1$ = −143.260
$d_{1-7}$ = 68.582

Example 4
f = 100.0  $F_{NO}$ = 1:5.0
M = −0.112 ×

| Surface No. | r | d | n | ν |
|---|---|---|---|---|
| 1 | 40.567 | 10.09 | 1.48749 | 70.1 |
| 2 | 23.822 | 13.65 | | |
| 3 | 59.624 | 12.60 | 1.79952 | 42.2 |
| 4 | −138.198 | 6.02 | | |
| 5 | −83.782 | 4.04 | 1.84666 | 23.9 |
| 6 | 83.782 | 2.02 | | |
| 7 | −114.198 | 17.97 | 1.77250 | 49.7 |
| 8 | −36.178 | 110.40 | | |
| 9 | ∞ | 2.83 | cover glass | |
| 10 | ∞ | | | |

$f_1$ = −147.541
$d_{1-7}$ = 66.379

Example 5
f = 100.0  $F_{NO}$ = 1:4.5
M = −0.112 ×

| Surface No. | r | d | n | ν |
|---|---|---|---|---|
| 1 | 53.917 | 8.09 | 1.49186 | 57.4 |
| 2 | 29.100 | 15.50 | | |
| 3 | 62.324 | 12.09 | 1.83481 | 42.7 |
| 4 | −199.026 | 7.19 | | |
| 5 | −71.520 | 8.09 | 1.80518 | 25.4 |
| 6 | 89.391 | 2.06 | | |
| 7 | −228.900 | 15.74 | 1.80400 | 46.6 |
| 8 | −40.249 | 110.09 | | |
| 9 | ∞ | 6.29 | cover glass | |
| 10 | ∞ | | | |

$f_1$ = −144.015
$d_{1-7}$ = 68.768

Figure 2:
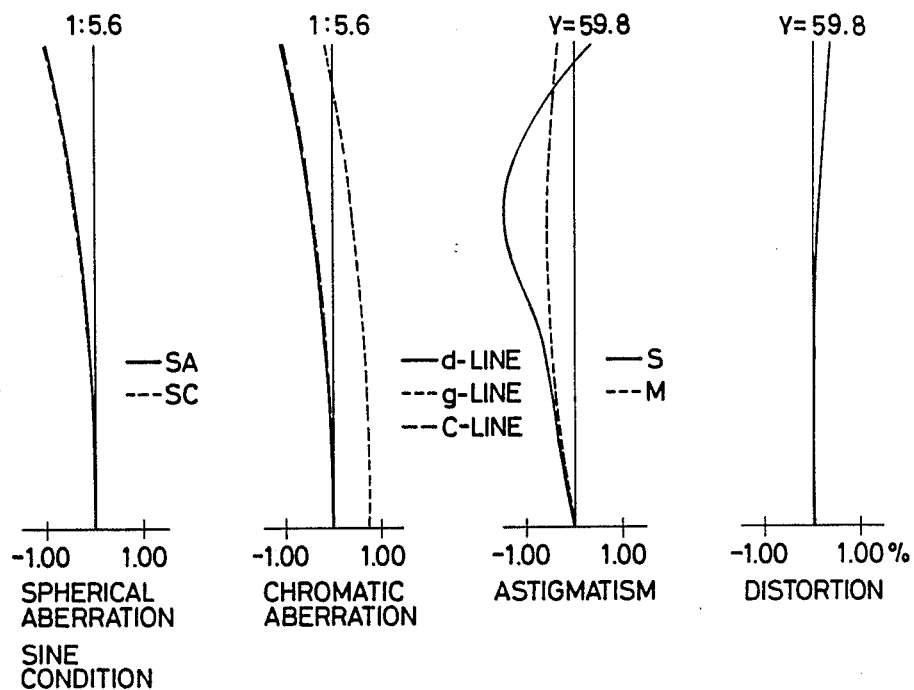
FIGS. 2, 4, 6, 8 and 10 are graphs plotting the aberration curves obtained at the viewing magnification used for the systems shown in Examples 1–5.
Figure 3:
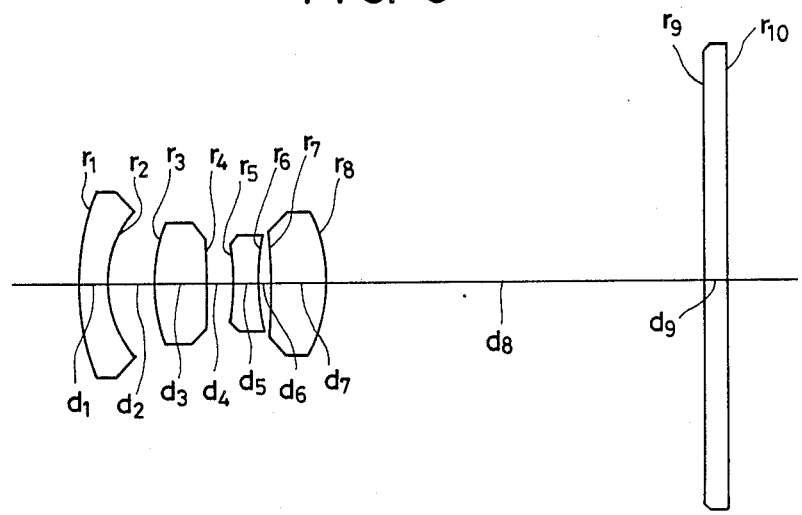
Figure 4:
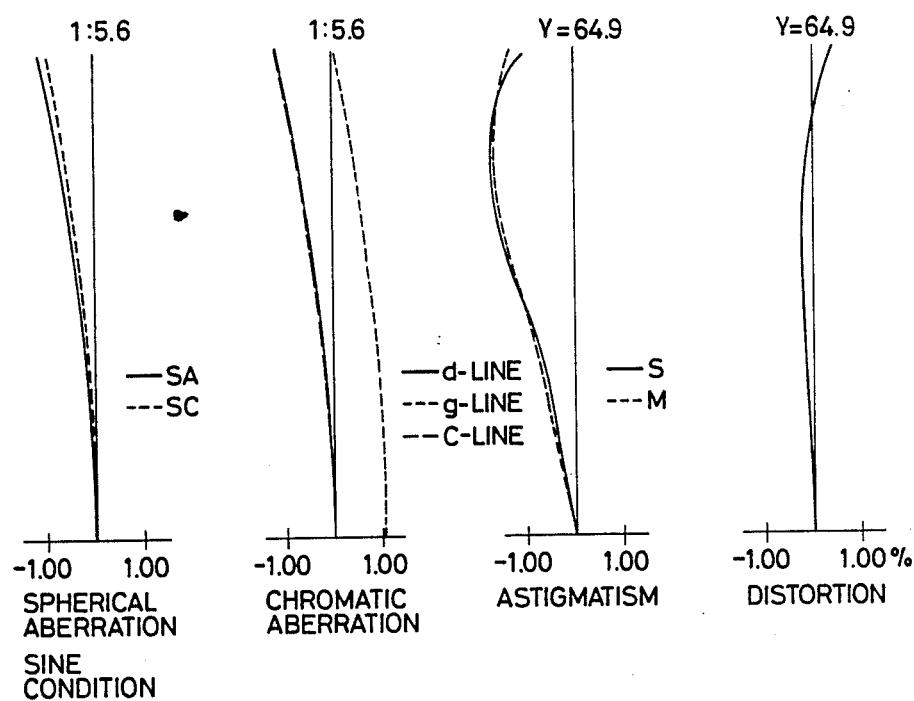
Figure 5:
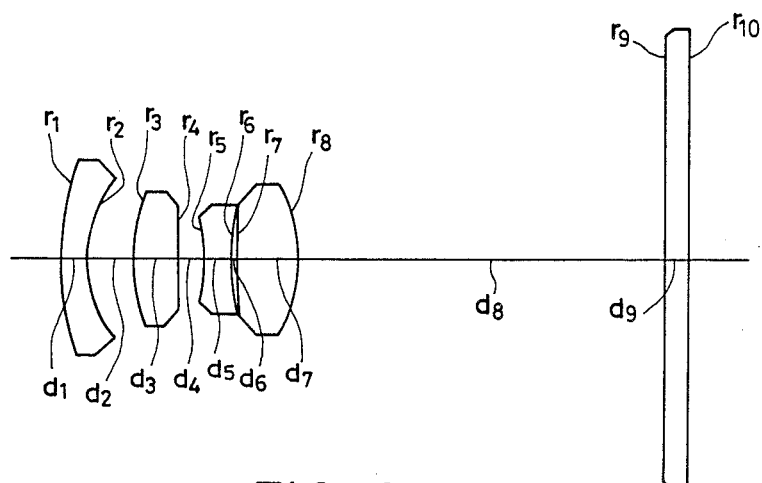
Figure 6:
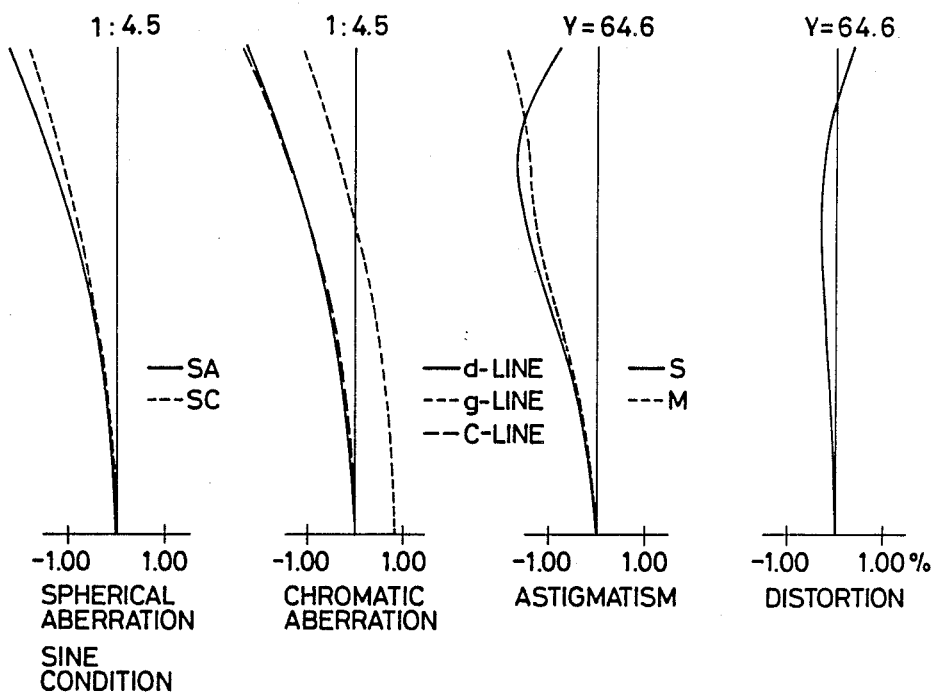
Figure 7:
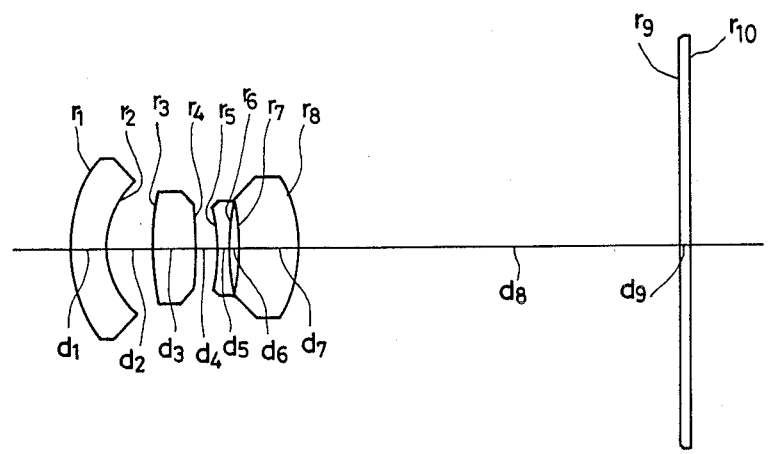
Figure 8:
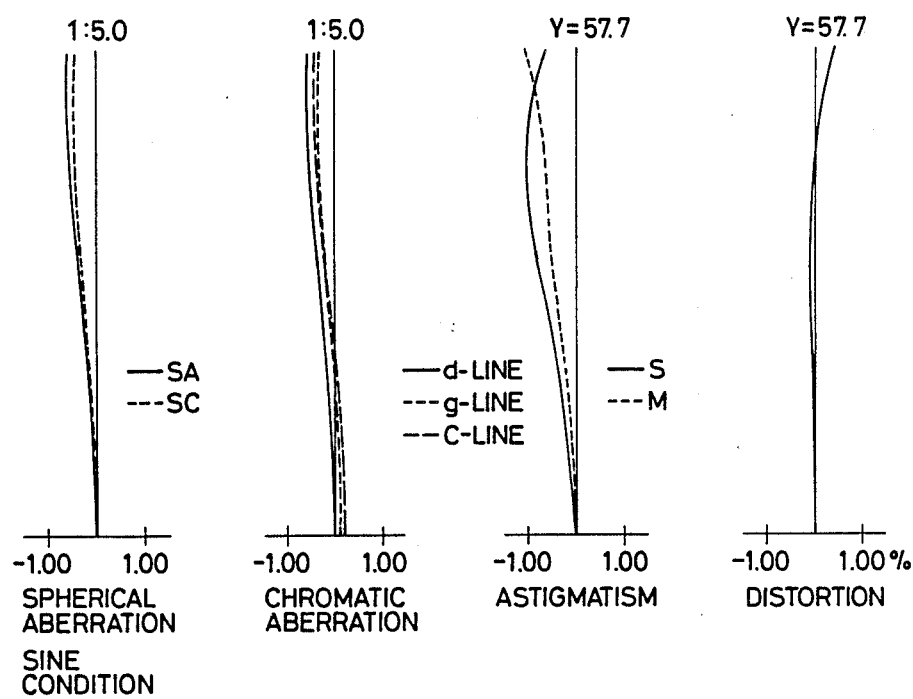
Figure 9:
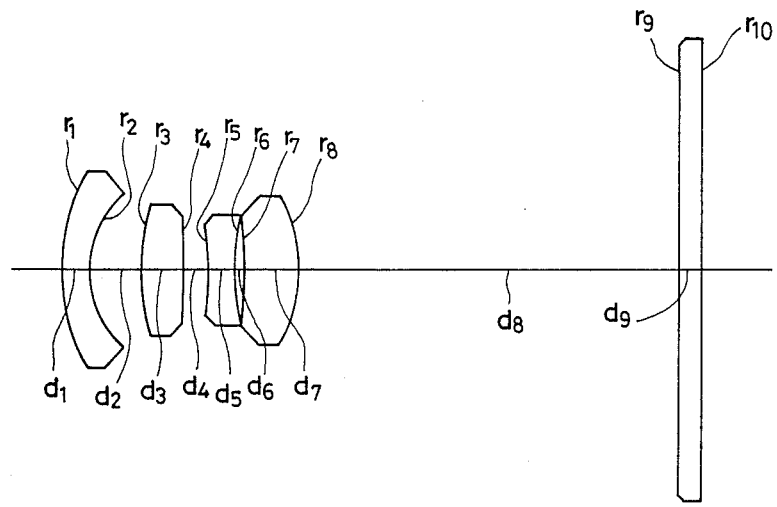
Figure 10:
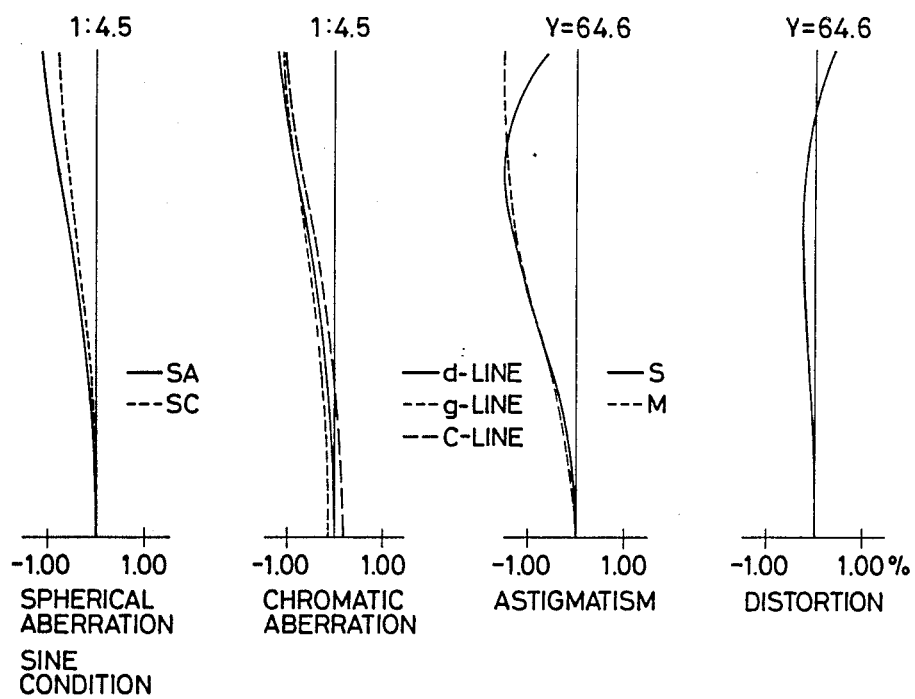

As described on the foregoing pages, the lens system of the present invention employs a retrofocus design so as to increase the aperture efficiency and achieve a resultant increase in the quantity of marginal light. This system also features wide-angle reading by permitting off-axis light to encounter the rear group at a small angle of incidence. In addition, as will be apparent from FIGS. 2, 4, 6, 8 and 10 which are graphs plotting the aberration curves obtained with the embodiments shown in Examples 1-5, the reading lens system of the present invention employs a simple 4-unit-4-element configuration and yet provides a superior performance over a broad view angle range that qualifies it for use with a facsimile or other imaging apparatus.

A further advantage of the lens system of the present invention is that since it restricts the passage of off-axis light only at a stop diaphragm, the aperture efficiency is maintained at 100% and higher so as to minimize the decrease in the quantity of marginal light.

What is claimed is:

1. A wide-angle reading lens system which comprises, in order from the object side, a first lens element which is a negative meniscus lens having its convex surface directed toward the object side, a second lens element which is a positive lens having a strong convex surface directed toward the object side, a third lens element which is a negative lens, and a fourth lens element which is a positive lens having a strong convex surface directed toward the image side, said lens system satisfying the following conditions:

$$-2.0f \leq f_1 \leq -0.75f \qquad (1)$$

$$\frac{n_2 + n_4}{2} \geq 1.72, \qquad (2)$$

$$\nu_2, \nu_4 \geq 35$$

$$d_{1-7} \leq 0.85f \qquad (3)$$

where f denotes the overall focal length of the system; $f_1$ is the focal length of the first lens element; $n_i$ is the refractive index of an ith lens at the d-line; $\nu_i$ is the abbe number of the ith lens; and $d_{1-7}$ signifies the distance from the surface of the first lens element on the object side to the surface of the fourth lens element on the image side.

2. The system according to claim 1 which further satisfies the following additional conditions:

$$d_2 \leq 0.20f \qquad (4)$$

$$0.3f \leq r_3 \leq 0.8f \qquad (5)$$

$$n_1 < 1.60 \qquad (6)$$

$$\nu_3 < 30 \qquad (7)$$

where $d_2$ signifies the aerial distance between the first and the second lens elements, and $r_3$ is the curvature of radius of the surface of the second lens element on the object side.

3. The system according to claim 1 which further satisfies the following chart:

f = 100.0  $F_{NO}$ = 1:5.6
M = −0.12 ×

| Surface No. | r | d | n | ν |
|---|---|---|---|---|
| 1 | 61.778 | 7.04 | 1.51633 | 64.1 |
| 2 | 33.566 | 15.08 | | |
| 3 | 41.283 | 10.64 | 1.77250 | 49.7 |
| 4 | −939.456 | 9.98 | | |
| 5 | −120.137 | 6.34 | 1.80518 | 25.4 |
| 6 | 49.507 | 6.99 | | |
| 7 | 206.799 | 16.34 | 1.77250 | 49.7 |
| 8 | −57.608 | 93.80 | | |
| 9 | ∞ | 4.93 | cover glass | |
| 10 | ∞ | | | |

$f_1$ = −155.74
$d_{1-7}$ = where f signifies the overall focal length of the lens system, $F_{NO}$ is the aperture ratio, M is the magnification, r is the curvature of radius of an individual lens surface, d is the thickness of an individual lens or the aerial distance between lenses, n is the refractive index of an individual lens at the d-line, and $\nu$ is the Abbe number of an individual lens.

4. The system according to claim 1 which further satisfies the following chart:

| | f = 100.0   $F_{NO}$ = 1:5.6 | | | |
|---|---|---|---|---|
| | M = −0.112 × | | | |
| Surface No. | r | d | n | $\nu$ |
| 1 | 72.805 | 8.11 | 1.51633 | 64.1 |
| 2 | 30.179 | 14.35 | | |
| 3 | 50.442 | 14.67 | 1.77250 | 49.7 |
| 4 | −159.578 | 7.21 | | |
| 5 | −81.889 | 8.11 | 1.80518 | 25.4 |
| 6 | 73.776 | 2.89 | | |
| 7 | −485.667 | 15.98 | 1.77250 | 49.7 |
| 8 | −42.859 | 109.90 | | |
| 9 | ∞ | 6.31 | cover glass | |
| 10 | ∞ | | | |
| | $f_1$ = −106.746 | | | |
| | $d_{1-7}$ = 71.317 | | | | where f signifies the overall focal length of the lens system, $F_{NO}$ is the aperture ratio, M is the magnification, r is the curvature of radius of an individual lens surface, d is the thickness of an individual lens or the aerial distance between lenses, n is the refractive index of an individual lens at the d-line, and $\nu$ is the Abbe number of an individual lens.

5. The system according to claim 1 which further satisfies the following chart:

| | f = 100.0   $F_{NO}$ = 1:4.5 | | | |
|---|---|---|---|---|
| | M = −0.112 × | | | |
| Surface No. | r | d | n | $\nu$ |
| 1 | 75.126 | 8.08 | 1.51633 | 64.1 |
| 2 | 35.907 | 13.38 | | |
| 3 | 52.334 | 12.93 | 1.80400 | 46.6 |
| 4 | −224.991 | 7.18 | | |
| 5 | −58.483 | 8.08 | 1.80518 | 25.4 |
| 6 | 82.585 | 1.71 | | |
| 7 | −1141.508 | 17.24 | 1.80400 | 46.6 |
| 8 | −42.253 | 106.70 | | |
| 9 | ∞ | 6.28 | cover glass | |
| 10 | ∞ | | | |
| | $f_1$ = −143.260 | | | |
| | $d_{1-7}$ = 68.582 | | | | where f signifies the overall focal length of the lens system, $F_{NO}$ is the aperture ratio, M is the magnification, r is the curvature of radius of an individual lens surface, d is the thickness of an individual lens or the aerial distance between lenses, n is the refractive index of an individual lens at the d-line, and $\nu$ is the Abbe number of an individual lens.

6. The system according to claim 1 which further satisfies the following chart:

| | f = 100.0   $F_{NO}$ = 1:5.0 | | | |
|---|---|---|---|---|
| | M = −0.112 × | | | |
| Surface No. | r | d | n | $\nu$ |
| 1 | 40.567 | 10.09 | 1.48749 | 70.1 |
| 2 | 23.822 | 13.65 | | |
| 3 | 59.624 | 12.60 | 1.79952 | 42.2 |
| 4 | −138.198 | 6.02 | | |
| 5 | −83.782 | 4.04 | 1.84666 | 23.9 |
| 6 | 83.782 | 2.02 | | |
| 7 | −114.198 | 17.97 | 1.77250 | 49.7 |
| 8 | −36.178 | 110.40 | | |
| 9 | ∞ | 2.83 | cover glass | |
| 10 | ∞ | | | |
| | $f_1$ = −147.541 | | | |
| | $d_{1-7}$ = 66.379 | | | | where f signifies the overall focal length of the lens system, $F_{NO}$ is the aperture ratio, M is the magnification, r is the curvature of radius of an individual lens surface, d is the thickness of an individual lens or the aerial distance between lenses, n is the refractive index of an individual lens at the d-line, and $\nu$ is the Abbe number of an individual lens.

7. The system according to claim 1 which further satisfies the following chart:

| | f = 100.0   $F_{NO}$ = 1:4.5 | | | |
|---|---|---|---|---|
| | M = −0.112 × | | | |
| Surface No. | r | d | n | $\nu$ |
| 1 | 53.917 | 8.09 | 1.49186 | 57.4 |
| 2 | 29.100 | 15.50 | | |
| 3 | 62.324 | 12.09 | 1.83481 | 42.7 |
| 4 | −199.026 | 7.19 | | |
| 5 | −71.520 | 8.09 | 1.80518 | 25.4 |
| 6 | 89.391 | 2.06 | | |
| 7 | −228.900 | 15.74 | 1.80400 | 46.6 |
| 8 | −40.249 | 110.09 | | |
| 9 | ∞ | 6.29 | cover glass | |
| 10 | ∞ | | | |
| | $f_1$ = −144.015 | | | |
| | $d_{1-7}$ = 68.768 | | | | where f signifies the overall focal length of the lens system, $F_{NO}$ is the aperture ratio, M is the magnification, r is the curvature of radius of an individual lens surface, d is the thickness of an individual lens or the aerial distance between lenses, n is the refractive index of an individual lens at the d-line, and $\nu$ is the Abbe number of an individual lens.

* * * * *